United States Patent Office 3,054,828
Patented Sept. 18, 1962

3,054,828
PROCESS FOR MAKING TRICHLORO-
NITROETHYLENE
Howard Johnston, Concord, Calif., assignor to The Dow
Chemical Company, Midland, Mich., a corporation of
Delaware
No Drawing. Filed Oct. 17, 1960, Ser. No. 62,840
3 Claims. (Cl. 260—644)

This invention relates to an improved process for making trichloronitroethylene.

This compound, which is of value because of its biological activity, has previously been prepared only by reacting the rare and explosive dichloroacetylene with the equally rare and difficultly handled nitryl chloride in ether solution at 0° C. (see Brintzinger and Pfannstiel, Zeit. anorg. Chem. 255, 325 (1948).

I have found that trichloroethylene, a cheap and readily available article of commerce, can be nitrated directly to trichloronitroethylene in reasonably good yield by using aqueous nitric acid in the appropriate concentration and amount and at a suitable temperautre.

Previous attempts to prepare this compound by direct nitration of trichloroethylene have resulted only in oxidative by-products. Thus, Boeseken (Rec. trav. chim. 32, 15) treated trichloroethylene with a sulfuric acid-98 percent nitric acid mixture at 0° C. Only oxidized products and no trichloronitroethylene were present in the reaction product. Also, Burrows and Hunter (J. Chem. Soc. 1932, 1357) refluxed 1 mole of trichloroethylene with 5.5 moles of 70 percent nitric acid. Only dichlorodinitromethane, trichloronitromethane, and other oxidation and decomposition products resulted.

Now, I have found that by treating trichloroethylene with about 1-3 molar equivalents of aqueous nitric acid in a concentration range of about 30-80 percent by weight, the reaction preferably being carried out at or near the reflux temperature of the mixture, reasonably good yields of trichloronitroethylene and only minor proportions of byproducts are obtained.

Evidently, the minimization of excess nitric acid is a critical factor in the success of the reaction. While approximately 1-3 molar equivalents of nitric acid to one of trichloroethylene is operable, I prefer to keep the proportion of nitric acid in the lower part of the range, at about 1.5–2.0 molar equivalents.

The concentration of the aqueous nitric acid is also an important factor in the course of the reaction. Concentrations of about 30–80 percent $HNO_3$ may be used and I prefer to use acid of a concentration near or slightly below that of ordinary concentrated nitric acid, that is, in an approximate range of 50–70 percent.

The reaction is carried out in the liquid phase, preferably at or about atmospheric pressure. Pressures above or below this level may be used.

I prefer to use a reaction temperature of about or slightly below the atmospheric reflux temperature of the reaction mixture, that is, about 75–90° C. Somewhat lower temperatures may be used with longer contact times.

The optimum time of reaction depends upon the proportion and concentration of the nitric acid and upon the reaction temperatures. For conditions within the listed preferred limits, this time is of the order of two hours.

Example 1

Trichloroethylene (454 gm.=3.47 g. moles) and 70 percent $HNO_3$ (684 g.=7.6 g. moles) were put in a flask and heated at reflux temperature (85–90° C.) for 2.3 hours. The reaction mixture was then poured into water and the oil which separated was isolated and dried. The dried oil weighed 400 g. Distillation of the dried oil through a column of 30 theoretical plates yielded 92 g. $CCl_2(NO_3)_2$ B.Pt. 43° C./18 mm. and 204 g.

$$CCl_2=CClNO_2$$

B.Pt. 59°/18 mm. 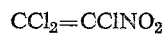 The remainder was higher boiling material, probably polymeric. Chemical analysis of the trichloronitroethylene, a light yellow oil, showed 13.7 percent carbon, 59.8 percent chlorine, 6.92 percent nitrogen. Calculated for trichloronitroethylene: 13.6 percent carbon, 60.2 percent chlorine, 7.93 percent nitrogen. The discrepancy in the nitrogen analysis is explained by the fact that nitrogen in this form is a notoriously difficult analytical problem.

Example 2

Trichloroethylene (435 g.=3.32 g. moles) and 70 percent $HNO_3$, (569 g.=6.32 g. moles) were refluxed together as in Example 1 for 2.5 hours. Separation and distillation of the 365 g. of water-insoluble oil in the reaction product as in Example 1 produced 54.7 g. $CCl_2(NO_2)_2$ and 185.0 g. $CCl_2=CClNO_2$. The rest was high boiling material. Chemical analysis of the trichloronitroethylene showed: 13.03 percent carbon, 59.75 percent chlorine, and 7.98 percent nitrogen.

Trichloronitroethylene is of value for its widespread biological activity. It is of particular value for the control of aquatic weeds whose unchecked growth in lakes and waterways causes both commercial and recreational losses. For example, 24 hours' exposure to a concentration in water of 10 parts per million trichloronitroethylene results in 99–100 percent death of the aquatic weeds *Anacharis spp., Cabomba caroliniana, Lysimaestrum nummularia, Salvinia rotundifolia,* and *Ceratophyllum spp.*

I claim:
1. A process for making trichloronitroethylene which comprises nitrating by contacting trichloroethylene with about 1–3 molar equivalents of aqueous nitric acid of about 30–80 percent by weight concentration.
2. A process as described in claim 1 wherein the nitration is carried out at about 75–90° C.
3. A process for making trichloronitroethylene which comprises nitrating by contacting trichloroethylene with about 1.5–2.0 molar equivalents of aqueous nitric acid of about 50–70 percent by weight concentration at a temperature of about 75–90° C.

References Cited in the file of this patent

Mitio Kono et al.: C.A., vol. 34, column 14146 (1940), "Reaction products of trichloroethylene and nitric acid."